US005513870A

United States Patent [19]
Hickman

[11] Patent Number: 5,513,870
[45] Date of Patent: May 7, 1996

[54] GUIDANCE SYSTEM FOR USE IN DOCKING A MOVABLE VEHICLE WITH A STATIONARY TARGET

[76] Inventor: Herbert D. Hickman, 830 Big Valley Dr., Colorado Springs, Colo. 80919

[21] Appl. No.: 449,490

[22] Filed: May 24, 1995

[51] Int. Cl.$^6$ ........................................... B60D 1/38
[52] U.S. Cl. ........................................... 280/477; 340/431
[58] Field of Search .................... 280/477, 478.1, 280/479.1; 340/431, 435, 436; 33/263, 264

[56] References Cited

U.S. PATENT DOCUMENTS

| | | | |
|---|---|---|---|
| Re. 28,590 | 10/1975 | Salmi | 280/477 |
| 2,736,885 | 2/1956 | Thompson | 340/431 |
| 3,731,274 | 5/1973 | Green | 340/431 |
| 3,938,122 | 2/1976 | Mangus | 340/431 |
| 4,017,977 | 4/1977 | Light et al. | 33/264 X |
| 4,030,775 | 6/1977 | Hill | 280/477 |
| 4,173,353 | 11/1979 | Steele | 280/477 |
| 4,186,939 | 2/1980 | Woods et al. | 280/477 |
| 4,187,494 | 2/1980 | Jessee | 340/431 |
| 4,432,563 | 2/1984 | Pitcher | 280/477 |
| 4,552,376 | 11/1985 | Cofer | 280/477 |
| 4,938,495 | 7/1990 | Beasley et al. | 280/477 |

Primary Examiner—Kevin T. Hurley
Attorney, Agent, or Firm—G. F. Gallinger

[57] ABSTRACT

A guidance system for use in docking a movable vehicle with a stationary target, such as a vehicle to be towed, includes a sensing unit pivotally mounted on a towing vehicle in alignment with a hitch member thereof and a display unit, electrically coupled to the sensing unit, the display unit being mounted on the towing vehicle in view of the driver, either directly or through use of a rear view mirror. A tensioned line is stored on a spring and reel assembly within the sensing unit and is adapted to be unreeled therefrom and attached to a connection point on the stationary target that is aligned with a hitch member of the stationary target. Optical switches within a shutter assembly through which the tensioned line passes sense lateral deviations from a position of perfect axial alignment of the tensioned line with the hitch members on both the towing vehicle and the stationary target. Electrical signals from the optical switches are used to appropriately illuminates a plurality of visual turn indicators on the display unit to signal to the driver of the towing vehicle the need for either a left or right turn correction, as required to axially align the hitch members of the towing vehicle and the stationary target. A stop function is provided to visually and audibly signal the driver of the towing vehicle when a predetermined closure distance between the towing vehicle and the stationary target has been reached.

11 Claims, 9 Drawing Sheets

GUIDANCE SYSTEM FOR USE IN DOCKING A MOVABLE VEHICLE WITH A STATIONARY TARGET

BACKGROUND AND SUMMARY OF THE INVENTION

This invention relates generally to docking systems of the type typically used to facilitate the alignment of a towing vehicle with respect to a towed vehicle that is to be coupled thereto and, more particularly, to a precision line guided system that enables the operator of the towing vehicle to position it for coupling to the towed vehicle without outside assistance. Usually, the hitch or other coupling members of the two vehicles are not in view of the operator of the towing vehicle as it is being maneuvered into position for attachment to the towed vehicle.

A tensioned line guided system offers the best basis for a precision docking system. However, continuous lateral misalignment sensing between an actual and a desired vehicle path poses serious problems in practical systems. Major design considerations in such systems include the axial tension in the line that is required to actuate the alignment sensors, the reliability of the sensing means over time due to exposure to weather, and the accommodation of terrain irregularities. A reliable means to sense closure of the towing vehicle and the towed vehicle is subject to the same design considerations. In addition, it is necessary to convey concise guidance information to the operator of the towing vehicle in a way that will allow safe operation thereof.

Several systems, both line guided and otherwise, are known in the prior art for providing guidance information when docking a towing vehicle with a vehicle to be towed. Exemplary of these prior art references are U.S. Pat. Nos. 4,187,494 to Jessee, 3,731,274 to Green, 3,938,122 to Mangus, Re. 28,590 to Salmi, 4,432,563 to Pitcher, 4,186,939 to Woods et al., 4,938,495 to Beasley et al., 4,552,376 to Cofer, and 2,736,885 to Thompson. However, each of these systems is disadvantageous in certain respects.

It is therefore the principal object of the present invention to provide a simple, low cost, yet highly precise guidance system for use in docking a towing vehicle with a stationary target.

This and other objects are accomplished in accordance with the illustrated preferred embodiment of the present invention by providing a sensing unit pivotally mounted about a horizontal axis on a towing vehicle in axial alignment with a hitch member thereof, and a display unit, electrically coupled to the sensing unit, the display unit being mounted on the towing vehicle in view of the driver, either directly or through the use of a rear view mirror. A tensioned line is stored on a spring and reel assembly within the sensing unit and is adapted to be unreeled therefrom and attached to a connection point on the stationary target that is aligned with a hitch member of the stationary target. The tensioned line passes through a movable shutter element of a shutter assembly within the sensing unit. Optical switches within the shutter assembly sense lateral deviations from a position of perfect axial alignment of the tensioned line with the hitch members on both the towing vehicle and the stationary target. Electrical signals from the optical switches are used to appropriately illuminate a plurality of visual turn indicators on the display unit to signal to the driver of the towing vehicle the need for either a left or right turn correction, as required to axially align the hitch members of the towing vehicle and the stationary target. A stop function is provided to visually and audibly signal the driver of the towing vehicle when a predetermined closure distance between the towing vehicle and the stationary target has been reached. A test switch is provided on the display unit to test the operational readiness of the visual and audible indicators thereof. A turn indicator reversing switch is also provided on the display unit to permit the driver of the towing vehicle to view the visual turn indicators either directly or by use of a rear view mirror.

DETAILED DESCRIPTION OF THE PREFERRED EMBODIMENTS

Figure 1:
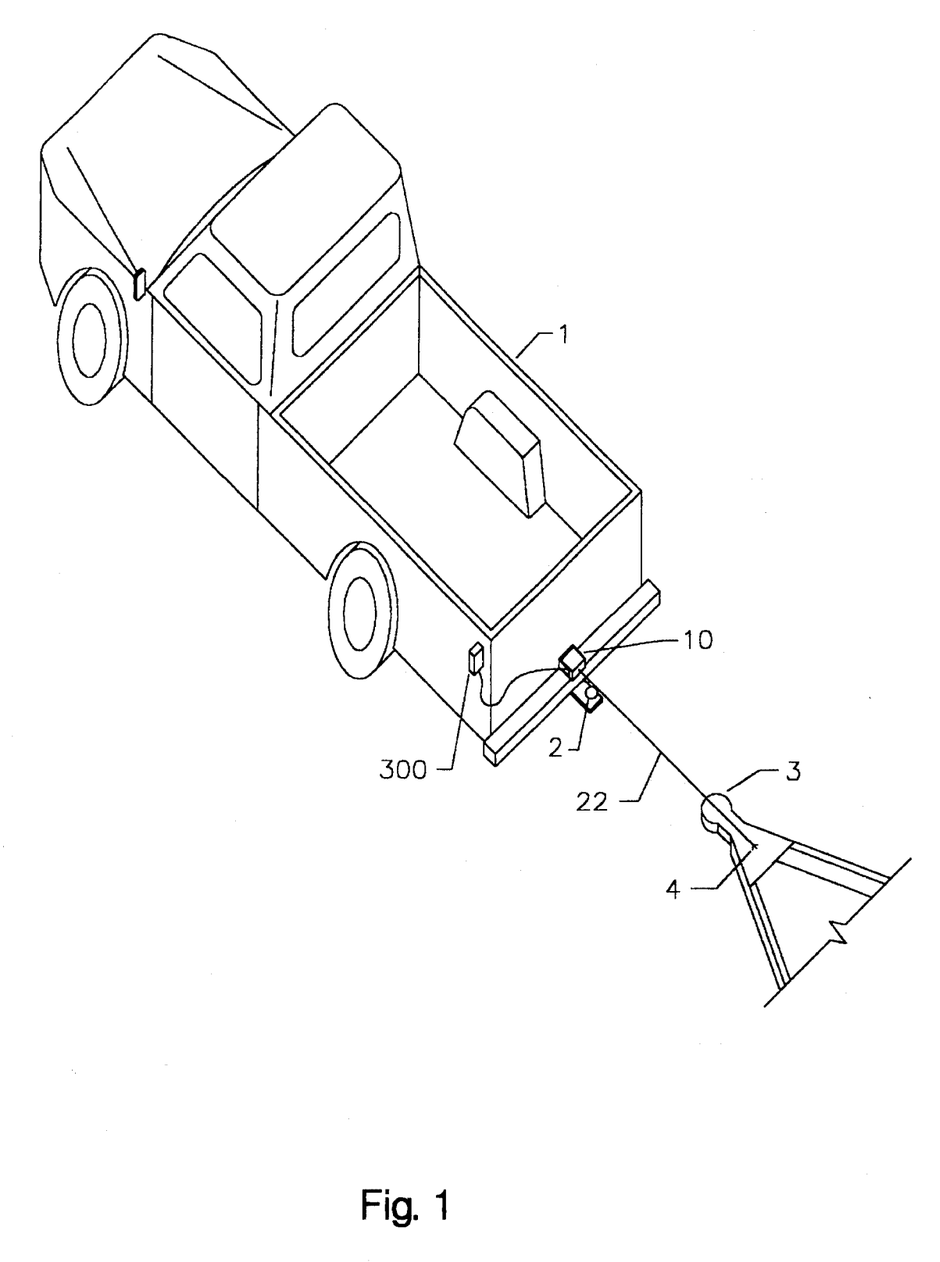
FIG. 1 is an overall pictorial diagram illustrating the way in which the docking system of the present invention is generally employed to position a towing vehicle for coupling to a towed vehicle.

Referring now to FIG. 1, there is shown the way in which the docking guidance system of the present invention is employed to aid the operator of a towing vehicle 1 as it is maneuvered into position for coupling a hitch member 2 thereof to a hitch member 3 of a vehicle to be towed, hereinafter referred to as the towed vehicle or target. The docking guidance system of the present invention includes a sensing unit 10 that is pivotally mounted on the rear of towing vehicle 1 in alignment with hitch member 2 and a display unit 300 that is preferably mounted on the driver's side of towing vehicle 1 proximate the rear thereof and is electrically coupled to sensing unit 10. Alternatively, display unit 300 may be mounted at any convenient location front or rear, inside or outside the towing vehicle 1, so long as it is in view of the driver, either directly or by way of a rear view mirror. In the case in which it is desired to couple a vehicle to be towed in front of towing vehicle 1, hitch member 2 is mounted at the front end of towing vehicle 1, and sensing unit 10 is correspondingly pivotally mounted on the front of towing vehicle 1 in alignment with a mating hitch member on the vehicle to be towed. A tensioned line 22 that is unreeled from within sensing unit 10 is attached to a line connection point 4 on the towed vehicle that is aligned with hitch member 3.

Figure 2A:
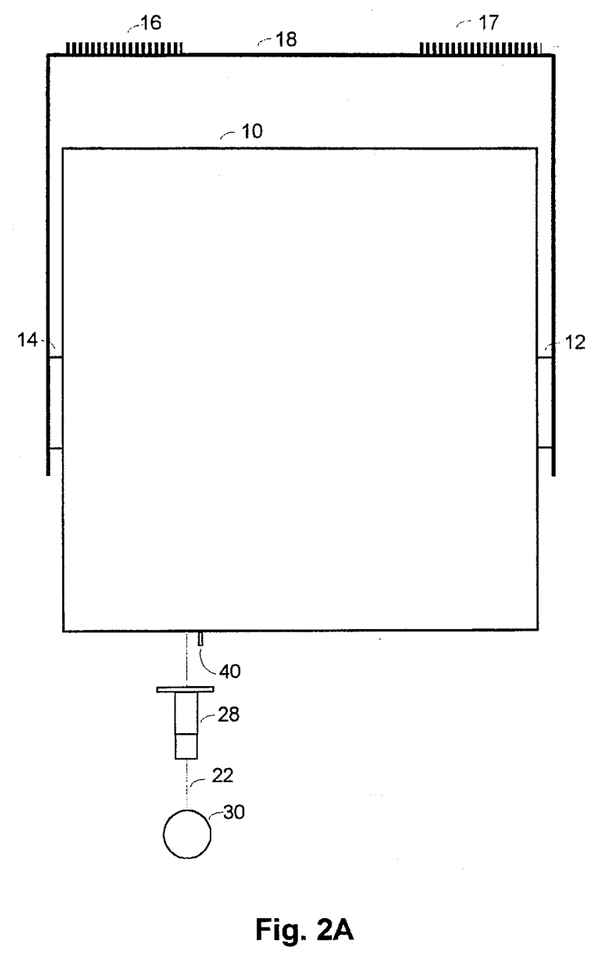
FIGS. 2A and 2B are top and side external views, respectively, of a sensing unit employed in the docking system of FIG. 1.
Figure 2B:
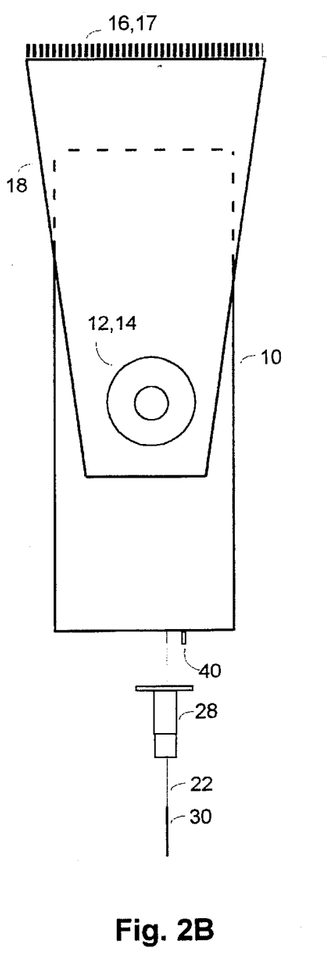
Figure 3:
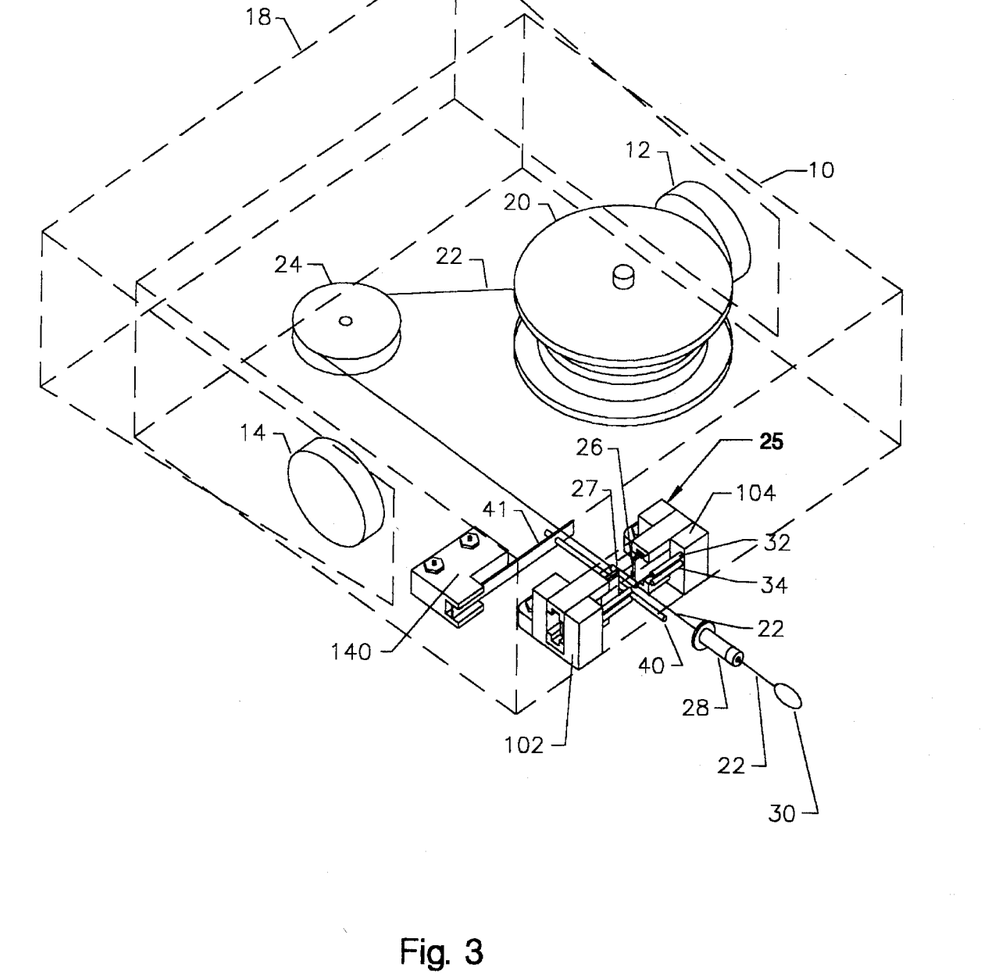
FIG. 3 is an internal pictorial diagram of the sensing unit of FIGS. 2A–B.
Figure 4A:
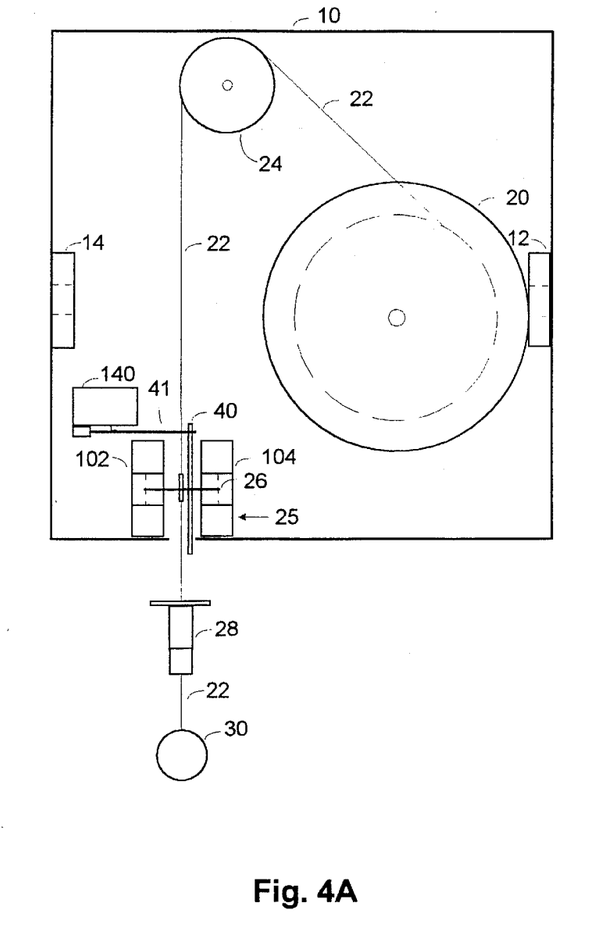
FIGS. 4A and 4B are top and side views, respectively, of the sensing unit of FIGS. 2A–B and 3, illustrating the positioning of the various components contained therein.
Figure 4B:
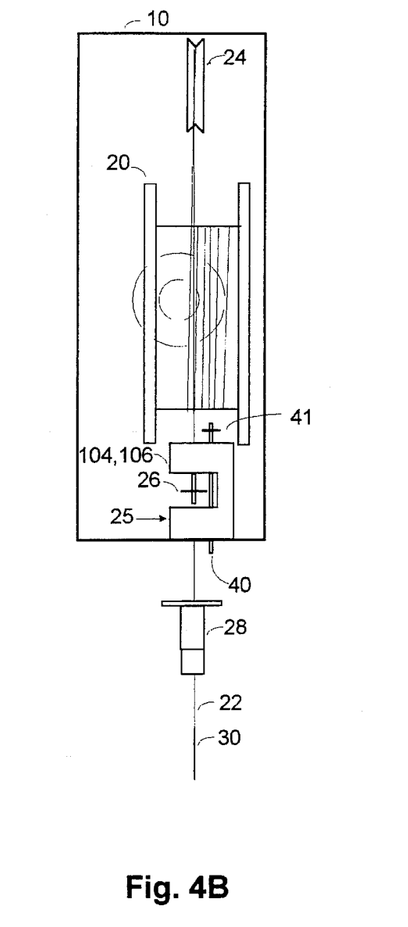
Figure 5A:
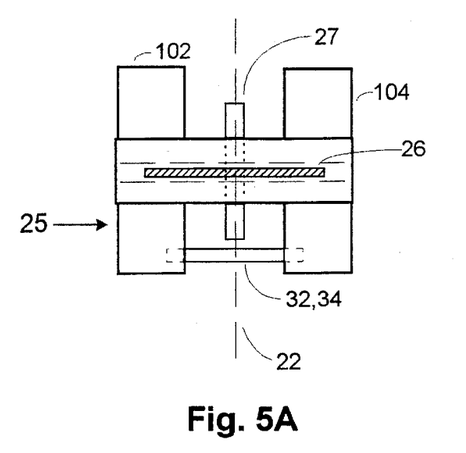
FIGS. 5A–C are top, front, and side views of the shutter assembly employed in the sensing unit of FIGS. 4A–B.
Figure 5B:
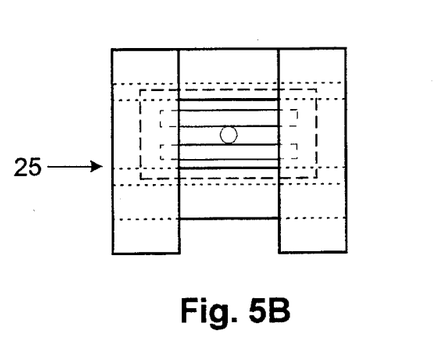
Figure 5C:
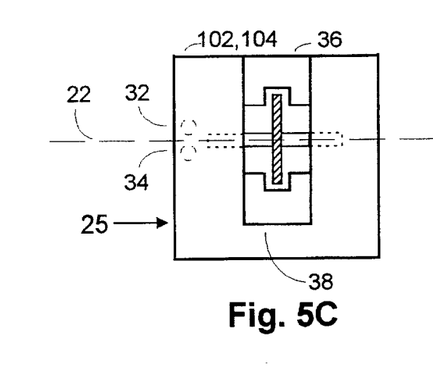
Figure 5D:
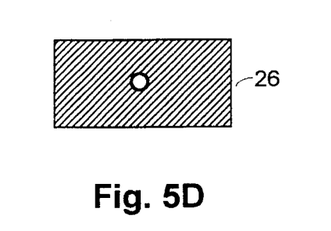
FIG. 5D is front view of a shutter element employed in the shutter assembly of FIGS. 5A–C.

Referring now to FIGS. 2A–B, there are shown top and side views of the exterior of sensing unit 10, which may be attached to the rear of vehicle 1 of FIG. 1 by means of a U-bracket 18 and a pair of hook and loop fasteners 16, 17. A pair of low-friction ball bearings 12, 14, permit sensing unit 10 to rotate with respect to U-bracket 18, as required by terrain conditions.

The internal mechanical details of sensing unit 10 may be understood with reference to FIGS. 3, 4A–B, and 5A–D. Tensiond line 22 is stored within sensing unit 10 on a spiral spring and reel assembly 20, which provides tension in line 22 as it is pulled therefrom and attached by means of a connecting loop 30 at its distal end to connection point 4 on the towed vehicle of FIG. 1. As tensioned line 22 leaves spiral spring and reel assembly 20, it is routed over an idler sheave 24 and exits sensing unit 10 through a shutter assembly 25.

Shutter assembly 25 includes a shutter element 26 having a pilot bearing 27 centrally located therein, through which tensioned line 22 passes. The inside diameter of pilot bearing 27 is only slightly larger than the diameter of tensioned line 22. Shutter element 26 fits loosely within an upper shutter guide 36 and a lower shutter guide 38 that allow shutter element 26 to move only laterally. A pair of optical switches 102, 104 are mounted transversely at either side of shutter assembly 25. As shutter element 26 moves laterally at the lateral urging of tensioned line 22 passing through pilot bearing 27, it interrupts a light path in each of the optical switches 102, 104. The length of shutter element 26 is slightly greater than the distance between the light paths in optical switches 102, 104 so that when shutter element 26 is laterally centered within shutter assembly 25, both light paths are interrupted. An upper guide bar 32 and a lower guide bar 34, spaced apart a distance that is slightly more than the diameter of tensioned line 22, serve to permit tensioned line 26 to move only laterally and to isolate the shutter element 26 from any vertical load from tensioned line 22 that may bind its lateral movement. In addition, upper and lower guide bars 32, 34 provide a moment arm to rotate the sensor unit 10 about ball bearings 12, 14. Pivoting of sensing unit 10 to accommodate a difference in elevation between it and line connection point 4 on the towed vehicle of FIG. 1, as well as terrain irregularities to be traversed as the towing vehicle approaches the towed vehicle, imposes tension requirements on tensioned line 22 that are kept acceptably low by causing the center of rotational mass of sensing unit 22 to be congruent with the center line of the ball bearings 12, 14. In order to further minimize any drag that may be imposed on free rotational movement of sensing unit 10, electrical conductors that carry signal between sensing unit 10 and display unit 300 of FIG. 1 are routed through a central aperture in ball bearing 14.

In order to implement a stop function for signalling the operator of the towing vehicle when a predetermined closure distance between the towing vehicle and the towed vehicle has been reached, a lever actuated, snap-action micro switch 140 is mounted within sensing unit 10. One end of a push rod 40 is attached to an actuating lever 41 of micro switch 140, while the other end of push rod 40 extends outside of sensing unit 10. An adjustable stop disc 28 is positioned on tensioned line 22 outside of sensing unit 10 so as to come into contact with and move push rod 40 when tensioned line 22 is retracted into sensing unit 10. Stop disc 28 is locked into position along tensioned line 22, spaced from connecting loop 30 such that the hitch members 2, 3 on the towing vehicle and the towed vehicle are at a desired horizontal distance from each other when stop disc 28 comes into contact with and moves push rod 40 to thereby actuate micro switch 140 as the towing vehicle approaches the towed vehicle.

Figure 6:
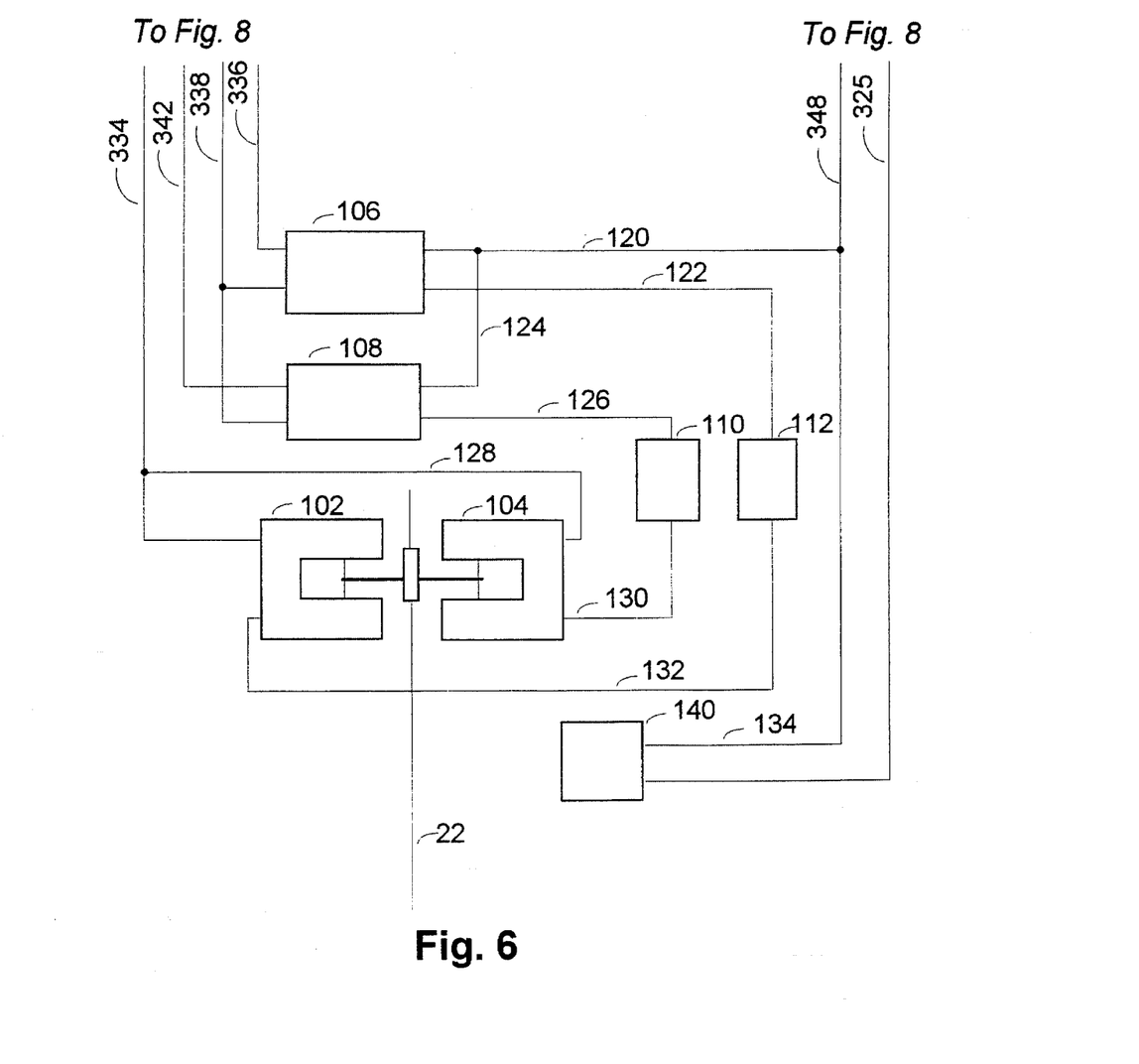
FIG. 6 is a detailed block diagram of a sensing circuit contained within the sensing unit of FIG. 3.

The electromechanical operation of shutter assembly 25 may be understood by also referring to the circuit block diagram of FIG. 6. Optical switches 102, 104 are connected to a pair of amplifiers 110, 112 that drive a pair of dry reed relays 106, 108 that function as left and right turn indicator relays. Optical switches 102 and 104, amplifiers 110 and 112, and reed relays 106 and 108 are all commercially available as off-the-shelf components. Optical switches 102, 104 preferably comprise infrared optical switches, which are less susceptible to false triggering from ambient or other stray light sources. Amplifiers 110, 112 and reed relays 106, 108 may be conveniently mounted on a conventional circuit board that is in turn mounted within sensing unit 10. Whenever, during a docking operation, the towing vehicle is in perfect axial alignment with the target, tensioned line 22 causes shutter element 26 to be laterally centered such that the light path in each of the optical switches 102, 104 is interrupted. Whenever the position of the towing vehicle deviates left or right from that of perfect axial alignment with the target, tensioned line 22 will cause shutter element 26 to move correspondingly left or right. In that situation, the light path in one of the optical switches 102, 104 is uninterrupted, which results in actuation of a corresponding one of the turn indicator relays 106, 108.

Communication of electrical signals between sensing unit 10 and display unit 300 is accomplished via a plurality of conductors 325, 334, 336, 338, 342, and 348. As stated hereinabove, these conductors are preferably routed from sensing unit 10 through a central aperture in ball bearing 14 to minimize any drag on rotational movement of sensing unit 10.

Figure 7:
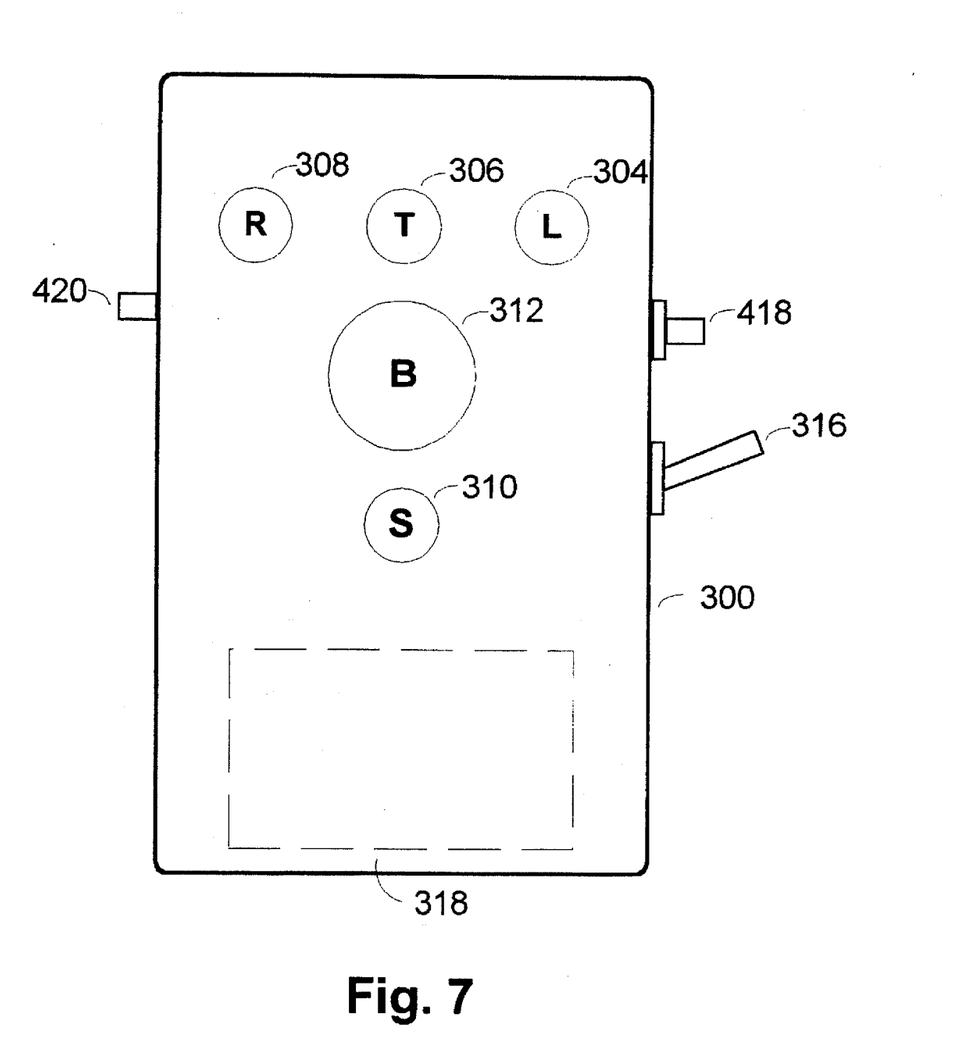
FIG. 7 is pictorial diagram of the front panel of a display unit employed in the docking system of FIG. 1.
Figure 8:
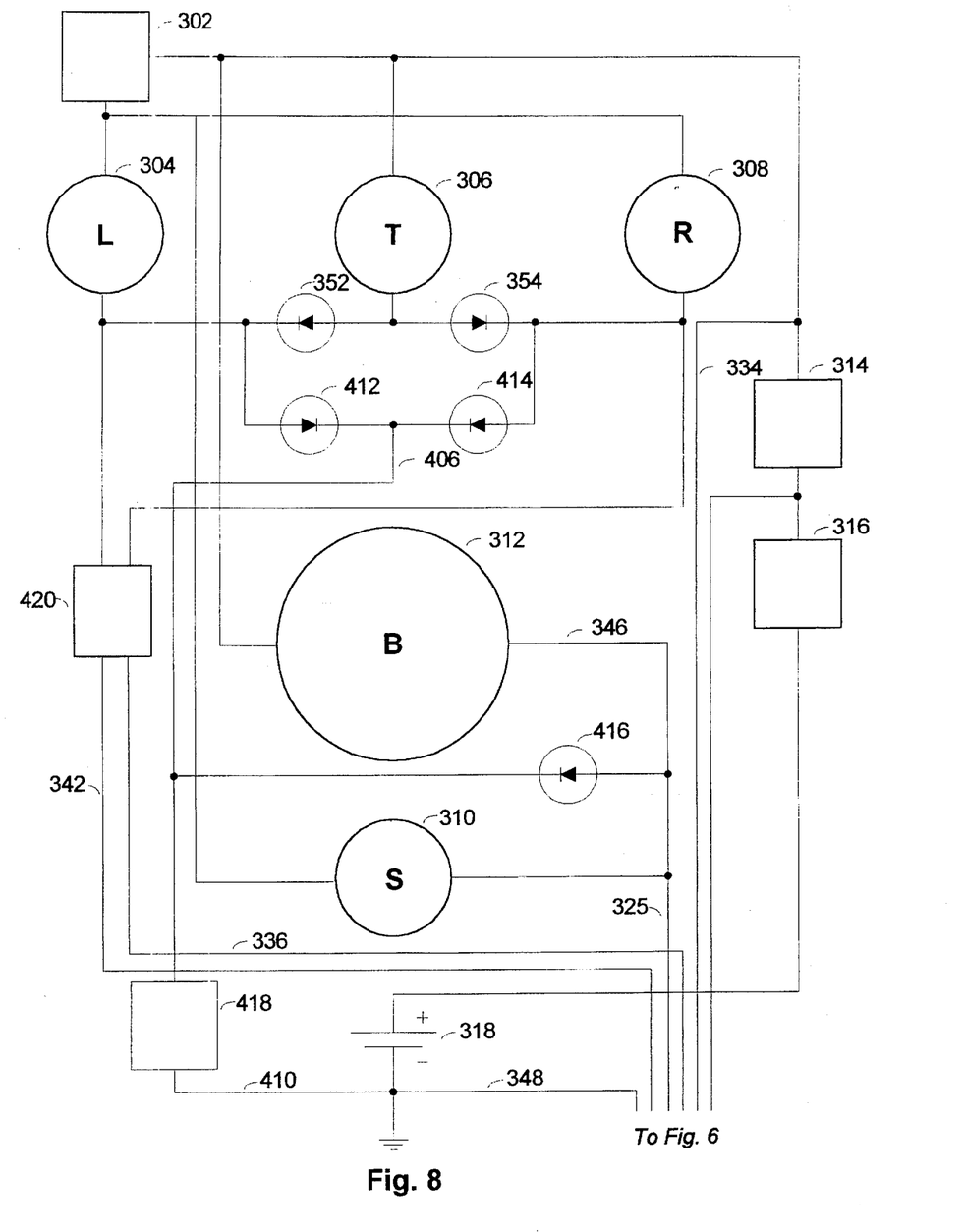
FIG. 8 is a detailed schematic diagram of a display circuit employed in the display unit of FIG. 7.

Operation of the display unit 300 may be understood with reference to the front panel pictorial diagram of FIG. 7 and the circuit diagram of FIG. 8. Three turn indicator lights 304, 306, 308 and a stop indicator light 310 are mounted on the front panel of display unit 300, along with an audible buzzer 312. A power switch 316, a push button test switch 418, and a turn indicator reversing switch 420 are conveniently mounted on the sides of display unit 300. Turn indicator reversing switch 420 is useful in applications in which display unit 300 is being viewed directly by the operator of the towing vehicle rather than in a rear view mirror thereof. Push button test switch 418 turns on indicator lights 304, 306, 308, 310, as well as buzzer 310, to confirm their operational readiness. Operating voltage for the sensing unit 10 and display unit 300 is supplied by a battery 318, that may be mounted within display unit 300 or that may comprise the towing vehicle battery. Operating voltage is applied to power switch 316 and then to a voltage regulator 314, whose output is stabilized at five volts. Conductor 338 carries voltage to the reed relays 106, 108. A conventional voltage interrupter 302 serves to blink turn indicator lights 304, 308 and stop indicator light 310. Two diodes 352, 354 function as coupling diodes during normal operation, and three additional diodes 412, 414, 416 serve as coupling diodes during the test function that is initiated by push button test switch 418. When the sensing unit 10 determines that a right turn correction is required of the operator of the towing vehicle, turn indicator light 306 is turned on in a steady mode. At the same time, turn indicator light 308 is also turned on in a blinking mode. Similarly, when a left turn correction is required, turn indicator light 306 is turned on in the steady mode and turn indicator light 304 is turned on in the blinking mode. When the predetermined closure distance between the towing vehicle and the target, as set by the stop disc 28, has been reached, stop indicator light 310 is turned on in the blinking mode, and buzzer 312 sounds in the steady mode.

Figure 9:
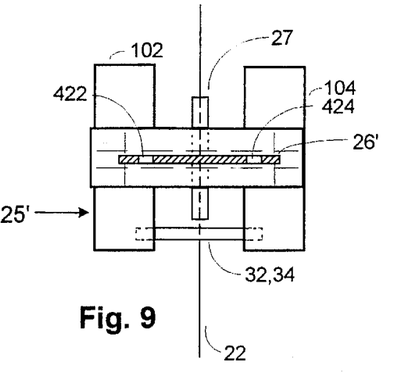
FIG. 9 is a top view of an alternative dual sensing shutter assembly that may be employed in the sensing unit of FIGS. 4A–B.
Figure 10:
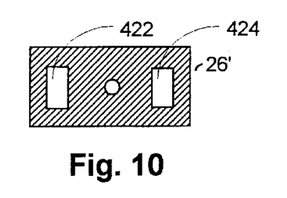
FIG. 10 is a front view of a dual sensing shutter element employed in the dual sensing shutter assembly of FIG. 9.
Figure 12:
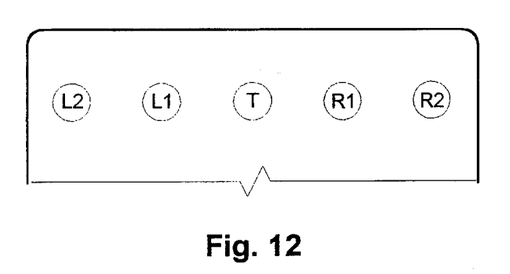
FIG. 12 is a cut away diagram illustrating the positioning of turn indicator lights on the front panel of the display unit of FIG. 7 when the dual sensing shutter assembly of FIG. 9 is employed in the sensing unit of FIGS. 4A–B.
Figure 13:
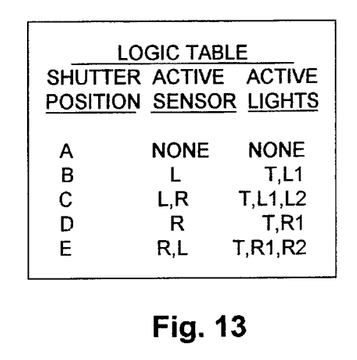
FIG. 13 is a logic table illustrating the relationship between shutter position, active sensor, and active turn indicator lights when the dual sensing shutter assembly of FIG. 9 is employed in the sensing unit of FIGS. 4A–B.

The preferred embodiment of the present described above provides one degree of turn signalling to the operator of the towing vehicle, regardless of the severity of axial misalignment of the towing vehicle and the target. A dual sensing alternative embodiment of the invention provides two degrees of signalling based on the severity of axial misalignment. In this alternative embodiment, the shutter element 26 of FIGS. 5A and 5D has been modified as illustrated in FIGS. 9 and 10. Shutter element 26' includes left and right apertures 422, 424. In addition, display unit 300 is modified to incorporate five turn indicator lights, as illustrated in FIG. 12, rather than the three turn indicator lights 304, 306, 308 of FIG. 7. Finally, a conventional logic unit is interposed between conductors 336 and 342 in the display circuit of FIG. 8 to implement, in accordance with known teachings in the art, the logic states illustrated in FIG. 13.

Figure 11:
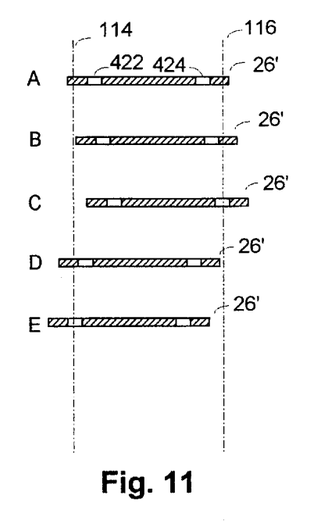
FIG. 11 is a diagram illustrating the possible shutter positions of the dual sensing shutter element of FIGS. 9 and 10.

Referring now to FIG. 11, it may be seen how light paths 114, 116 of optical switches 102, 104, respectively, are either interrupted or uninterrupted, as a function of the possible positions A, B, C, D, E of shutter element 26'. Shutter position A represents the position of shutter element 26' when the towing vehicle and target are in perfect axial alignment. In this condition, light paths 114, 116 are both interrupted, and none of the turn indicator lights of FIG. 12 is on. If the towing vehicle requires some degree of correction to the left, shutter element 26' is in shutter position B, wherein light path 112 is interrupted and light path 114 is uninterrupted, thereby turning on turn indicator lights T and L1 of FIG. 12. Should the towing vehicle require a greater correction to the left, shutter element 26' is in shutter position C, wherein light paths 114, 116 are both uninterrupted, thereby additionally turning on turn indicator light L2. Similarly, shutter positions D, E result when various degrees of correction to the right are required of the towing vehicle. The width of each of the apertures 422, 424 in shutter element 26' may be modified, as desired, to tailor when turn indicator lights L2 and R2 are to be turned on. Entries in the logic table of FIG. 13 for shutter positions C and E are different to reflect which of light paths 114, 116 is first uninterrupted. In the event both light paths 114, 116 are uninterrupted when operating power is applied to the dual sensing docking system, a question arises as to which of light paths 114, 116 was first uninterrupted. Any such ambiguity is readily resolved by the operator clearing the system at the time of set-up by deflecting tensioned line 22 just outside the sensing unit 10 from left to right and then releasing it. Any time that operating power is applied to the dual sensing docking system and shutter element 26' passes shutter position A shown in FIG. 11, the subsequent question of left versus right is resolved.

I claim:

1. A navigational aid for use in docking a towing vehicle with a stationary target, the navigational aid comprising:

a sensing unit, pivotally mounted about a horizontal axis, and in use being mounted in axial alignment with a coupling point on the towing vehicle;

a flexible line, stored within the sensing unit, a free end of the flexible line being withdrawable, under tension, from the sensing unit for connection to a target point on the stationary target, the sensing unit being operative for detecting axial misalignment of the flexible line between the sensing unit and the target point on the stationary target to thereby indicate axial misalignment between the coupling point on the vehicle and the target point on the stationary object;

a display unit, electrically coupled to the sensing unit, the display unit in use being mounted on the towing vehicle in view of a driver thereof, the display unit including turn indicator means for providing a visual indication to the driver of the direction of a turn that is required to correct axial misalignment between the coupling point on the towing vehicle and the target point on the stationary target;

said sensing unit having a retractable line storage reel and line tensioning means cooperating therewith, the line storage reel being operative for allowing the flexible line to be unwound therefrom in preparation for a docking operation and to be retracted thereon during the docking operation, and also having line reference means in cooperation with the retractable line storage reel for providing a precise reference for detecting axial misalignment of the flexible line, and said sensing unit including an optical shutter having a pilot bearing through which the line passes, upper and lower guides for permitting only lateral movement of the flexible line and optical shutter, and a pair of optical switches positioned on opposite sides of the optical shutter for sensing lateral movement of the axial shutter and corresponding axial misalignment of the flexible line.

2. A navigational aid for use in docking a towing vehicle with a stationary target as in claim 1, wherein the line reference means comprises an idler sheave.

3. A navigational aid for use in docking a towing vehicle with a stationary target as in claim 1, wherein the sensing unit includes relay means electrically coupled to the pair of optical switches for electrically driving the display unit.

4. A navigational aid for use in docking a towing vehicle with a stationary target as in claim 1, further comprising an electrical cable connecting the sensing unit to the display unit.

5. A navigational aid for use in docking a towing vehicle with a stationary target as in claim 1, wherein the display unit includes test means actuable by the driver to test operation of the turn indicator means and the stop indicator means.

6. A navigational aid for use in docking a towing vehicle with a stationary target as in claim 1, wherein in the display unit includes turn indicator reversing means for reversing the visual indication provided by the turn indicator means.

7. A navigational aid for use in docking a towing vehicle with a stationary target, the navigational aid comprising:

a sensing unit, pivotally mounted about a horizontal axis, and in use being mounted in axial alignment with a coupling point on the towing vehicle, said sensing unit including distance sensing means operative for detecting a predetermined horizontal closure distance between the coupling point on the towing vehicle and the target point on the stationary target, said distance sensing means including a stop disc adjustably positioned on the flexible line and means for detecting the position of the stop disc as the flexible line is being retracted into the sensing unit during the docking operation;

a flexible line, stored within the sensing unit, a free end of the flexible line being withdrawable, under tension, from the sensing unit for connection to a target point on the stationary target, the sensing unit being operative for detecting axial misalignment of the flexible line between the sensing unit and the target point on the stationary target to thereby indicate axial misalignment between the coupling point on the vehicle and the target point on the stationary object; and, a display unit, electrically coupled to the sensing unit, the display unit in use being mounted on the towing vehicle in view of a driver thereof, the display unit in use being mounted on the towing vehicle in view of the driver thereof, the display unit including turn indicator means for providing a visual indication to the driver of the direction of a turn that is required to correct axial misalignment between the coupling point on the towing vehicle and the target point on the stationary target, said display unit including stop indicator means for providing an indication to the driver that the predetermined horizontal closure distance has been reached during a docking operation.

8. A navigational aid for use in docking a towing vehicle with a stationary target as in claim 7, wherein the stop indicator means comprises audible indicator means.

9. A navigational aid for use in docking a towing vehicle with a stationary target as in claim 7, wherein the display unit is adapted to be mounted on a driver's side of the towing vehicle at the rear thereof so as to be visible by the driver when viewing the stationary target in a rear view mirror of the towing vehicle.

10. A navigational aid for use in docking a towing vehicle with a stationary target, the navigational aid comprising:

a sensing unit, pivotally mounted about a horizontal axis, and in use being mounted in axial alignment with a coupling point on the towing vehicle;

a flexible line, stored within the sensing unit, a free end of the flexible line being withdrawable, under tension, from the sensing unit for connection to a target point on the stationary target, the sensing unit being operative for detecting axial misalignment of the flexible line between the sensing unit and the target point on the stationary target to thereby indicate axial misalignment between the coupling point on the vehicle and the target point on the stationary object;

a display unit, electrically coupled to the sensing unit, the display unit in use being mounted on the towing vehicle in view of a driver thereof, the display unit in use being mounted on the towing vehicle in view of the driver thereof, the display unit including turn indicator means for providing a visual indication to the driver of the direction of a turn that is required to correct axial misalignment between the coupling point on the towing vehicle and the target point on the stationary target; and, an electrical cable connecting the sensing unit to the display unit, said cable exiting the sensing unit at a port that is in alignment with said horizontal axis about which the sensing unit is pivotably mounted, to thereby minimize rotational forces imposed on the sensing unit by the electrical cable.

11. A navigational aid for use in docking a towing vehicle with a stationary target as in claim 10, further comprising sealed ball bearing means, pivotally mounting the sensing unit about its horizontal center of gravity so that in use the unit will readily maintain accurate alignment with the stationary target throughout the docking operation.

* * * * *